UNITED STATES PATENT OFFICE.

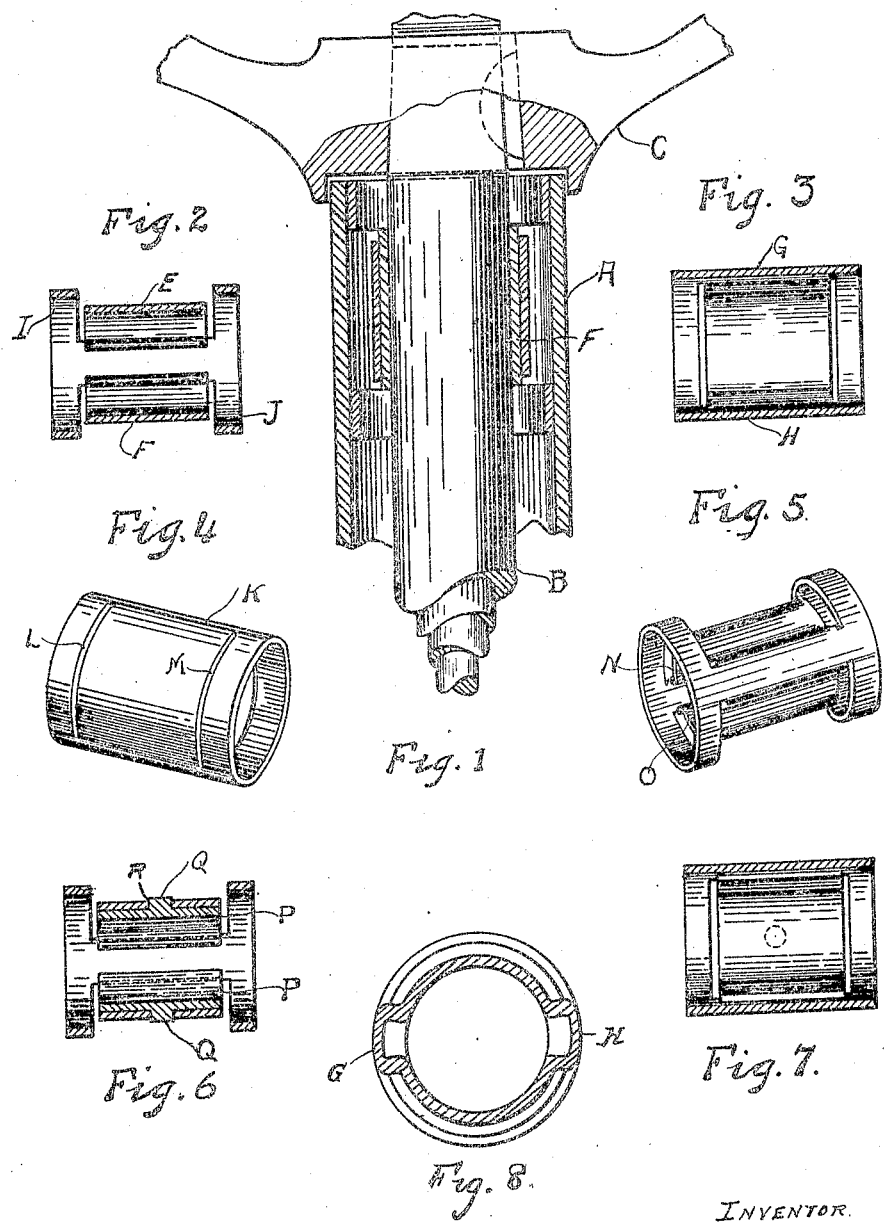

WILLIAM C. VAN DRESSER, OF DETROIT, MICHIGAN, ASSIGNOR TO GEMMER MANUFACTURING COMPANY, OF DETROIT, MICHIGAN, A CORPORATION OF MICHIGAN.

BUSHING.

1,103,107.   Specification of Letters Patent.   Patented July 14, 1914.

Application filed February 11, 1913. Serial No. 747,668.

*To all whom it may concern:*

Be it known that I, WILLIAM C. VAN DRESSER, a citizen of the United States of America, residing at Detroit, in the county of Wayne and State of Michigan, have invented certain new and useful Improvements in Bushings, of which the following is a specification, reference being had therein to the accompanying drawings.

My invention relates to bushings for concentric shafts, and more particularly to that type of bushing which forms both a spacer and a bearing.

The invention resides in the provision of a simple and efficient device which may be easily and cheaply manufactured; in the forming of a bearing portion resilient so as to automatically take up wear, and permit the bearing to be engaged with shafts of slightly varying diameters; and further in certain novel constructions and arrangements of parts.

In the drawings, Figure 1 is a longitudinal, central section through a pair of concentrically arranged shafts having my improved bushing applied thereto; Fig. 2 is a longitudinal section through the spacer; Fig. 3 is a section on the line $x$—$x$ of Fig. 1; Fig. 4 is a perspective view of the blank from which the spacer is formed; Fig. 5 is a similar view of the finished article; and Fig. 6 illustrates a modification; Fig. 7 is a longitudinal sectional view through Fig. 4. Fig. 8 is a transverse sectional view of Fig. 5.

A designates the hollow outer shaft and B the inner concentric shaft, the former being herein shown as the outer sleeve of a steering stem, and the latter as the rotatable controlled member that is fixedly secured to the steering wheel C.

My improved bushing is made of metal, preferably steel, and has bearing portions E and F tightly fitting the inner shaft but permitting the latter to turn therein, and is provided with annular spacing rings I and J and integral connecting portions G and H, the connecting portions being arranged as shown at substantially diametrical points. The bearing portions E and F have their side edges free from the spacing rings I and J and their ends integral with the connecting portions G and H.

The bushing is made from a tubular blank K (see Fig. 5) slitted at spaced points L M on each side, the slits extending only part way around the blank leaving the connecting portions G H. The blank is then engaged with suitable dies to force inward the portion of the metal intermediate the slits. This provides laterally extending flanges N O at opposite side edges of the segments which merge into the connecting portions. The latter, therefore, carry the segments and with the parts H I form channel-shaped connections between the adjacent ends of the opposed bearing segments. Such a structure not only is easily and cheaply manufactured, since it may be readily formed from a tubular blank, but also the manner of connecting the opposed segments of the bearing, give them a certain degree of resiliency sufficient to take up wear occurring between the bearing and the rotatable shaft. This resiliency also permits a slight variation in the diameter of the inner shaft, thereby avoiding the necessity of machining the inner shaft to a highly accurate given diameter.

In the modification shown in Fig. 6 the bearing is provided with lining plates P of configuration complementary to the bearing segments and secured thereto as by means of pins Q on the lining plates engaging apertures R in the segments. Thus, if the lining plates become worn they may be readily removed or replaced by new ones.

What I claim as my invention is:—

1. A bushing comprising annular spacing sections composed of separated spacing rings, a resilient bearing composed of opposed segmental portions having their ends free from the spacing sections, and a connection between the spacing sections and the sides of the segmental bearings, said parts being formed of a single piece of metal.

2. A bushing comprising separated spacers connecting portions integral with the spacers, and opposed resilient segmental bearing portions having their longitudinal edges integral with the connecting portions and their opposite transverse ends free from the spacers.

3. A bushing comprising spaced endless bands, a plurality of connected portions extending between said bands, the outer faces of the connecting portions lying in the plane of the band at the point of connection therewith, and opposed segmental bearing portions arranged intermediate the bands and having their side edges integral with the connecting portions and their opposite ends free from the bands, said segmental portions forming a bearing of lesser diameter than the diameter of the bands.

4. A bushing comprising separated spacers, connecting portions integral with the spacers, and opposed resilient bearing portions having their longitudinal edges integral with the connection portions and their transverse ends free from the spacers, and segmental lining plates for the bearing portions.

In testimony whereof I affix my signature in presence of two witnesses.

WILLIAM C. VAN DRESSER.

Witnesses:
FRED M. KERN,
CHARLES G. DORAN.